June 6, 1961 E. C. BARTON 2,987,329
CORRUGATED METAL HOSE CONNECTIONS
Filed July 11, 1958
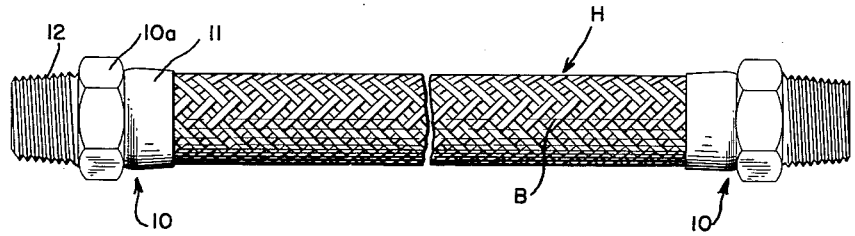
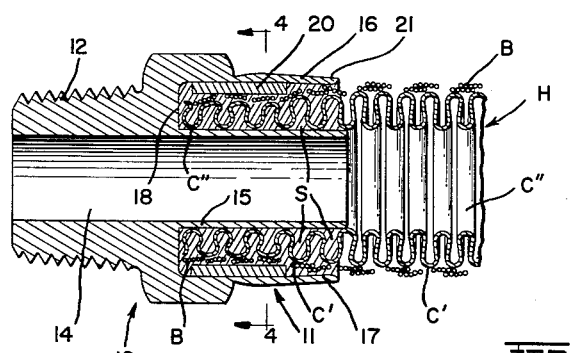
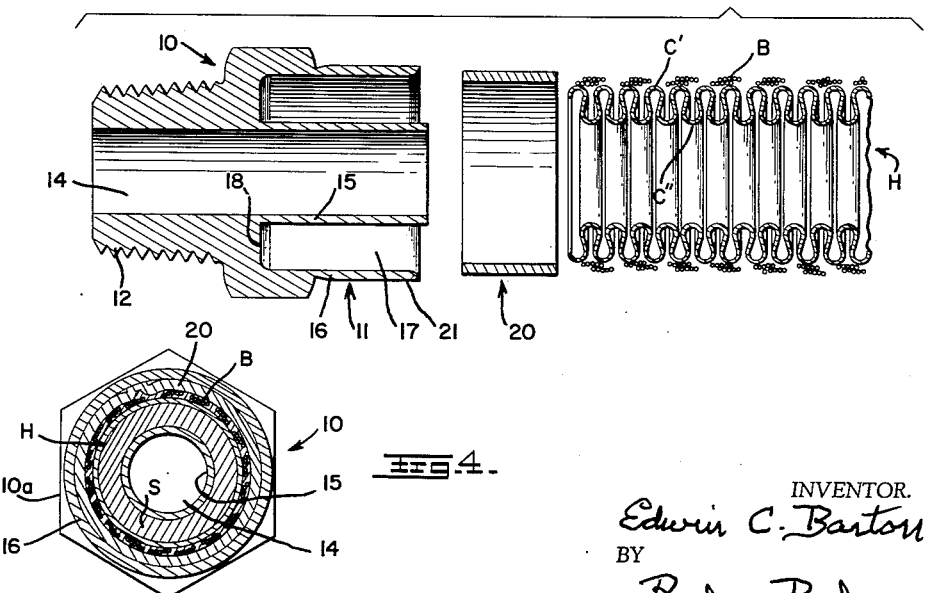
INVENTOR.
Edwin C. Barton
BY
Peck & Peck
Attorneys.

United States Patent Office 2,987,329
Patented June 6, 1961

1

2,987,329
CORRUGATED METAL HOSE CONNECTIONS
Edwin Charles Barton, White Plains, N.Y., assignor to Packless Metal Hose, Inc., Mount Vernon, N.Y., a corporation of New York
Filed July 11, 1958, Ser. No. 748,064
2 Claims. (Cl. 285—149)

This invention relates to certain improvements in corrugated metal hose connections, and particularly to such connections for corrugated metal hose of the types sheathed with a metallic braid; and the nature and objects of the invention will be readily recognized and understood by those skilled in the art in the light of the following explanation and detailed description of the accompanying drawings illustrating what I presently believe to be a preferred embodiment or mechanical expression of my invention from among various other embodiments, expressions, designs, constructions and combinations of which the invention is capable within the broad spirit and scope thereof as defined in and by the claims hereto appended.

In the forms of connection fittings or couplings in general commercial use, the fittings are either solely soldered into attached, permanent position on the end of the flexible metal hose with the solder forming the mechanical connection or joint as well as a seal between the hose and the fitting; or the fitting is both swaged and soldered with the swaging and the solder together forming the mechanical joint or connection between the fitting and the hose while the solder additionally forms a seal therebetween. In those connections in which the fitting is swaged onto the corrugated metal hose end, it is frequently found that the swaging distorts or deforms and seriously damages or destroys the corrugations of the metal hose at the locations engaged by the swaged portions of the fitting with the result that the hose is weakened at such locations and may fracture or break with resulting leakage and failure of the connection. The possibility of hose failure is substantially increased if the damaged corrugations are at the location on the hose where primary flexing or bending of the hose in operation and use takes place. It is found that even slight variations in the specified outside diameter of the corrugated metal hose, with the usual fixed degree of swage for which the hose swaging mechanism is set, will result in overswaging larger diameters if the degree of swage is set sufficiently close to engage and hold the smaller diameters of the diameter variations of the metal hose.

Generally such corrugated metal hose is encased or sheathed with a woven metallic material braid. Due to the manner in which such metallic braid is woven, the braid at one end of a length of metal hose will squeeze or contract tightly down onto the hose but will at the other end of the length of hose expand radially and flare out from the hose and by so doing tend to unravel the metallic threads or wires from which the braid is woven. This presents a problem in applying a connection fitting to that end of a hose length or section at which the braid flares out and tends to unravel due to the difficulty in inserting the hose length end into the fitting into position with the fitting positioned and engaged over the exterior surface of the braid which sheaths the hose section.

It is a general object of my present invention to overcome the foregoing and other problems and the difficulties resulting therefrom by providing a connection fitting of simple design and construction which may be both swaged and soldered into securely attached and sealed position on and over the end of a length or section of corrugated metal hose having a sheathing braid, without damage to the hose corrugations and resulting weakening of the hose while providing an easily assembled connection which, when swaged and soldered, will provide a firm and rigid connection of long life with substantially reduced possibility of failure under the conditions to which the connection is subjected in operation and use.

A further object is to provide a swaged-solder connection for flexible, corrugated metal hose in which injury or damage to the corrugations of the hose by the swaging of the connection fitting into assembled position engaged thereon is reduced to a minimum.

Another object is to provide such a connection fitting in which the swaging of portions of the connection into engagement with the corrugated metal hose is at locations removed from points of primary flexing or bending of the hose so that any injured or damaged corrugations that may result from such swaging will not be subjected to substantial bending or flexing loads.

A further object is to provide a connection fitting for metallic braid sheathing encased, flexible corrugated metal hose in which the connection fitting is mechanically locked onto the hose section against displacement axially therefrom without direct and maximum swaging of the fitting itself into engagement with the metal hose so that in the event of failure of the solder joint or bond of the connection through solder disintegration or otherwise, the fitting will not be displaced or blown from the hose section by pressures within the latter.

Another object is to provide a swaged and soldered connection for flexible, corrugated metal hose in which the primary swaging is effected with a ring member swaged tightly onto the hose section at and adjacent an end thereof, while the connection fitting itself instead of being swaged into tight engagement with and onto the hose section is swaged into interlocked relation with the ring member for the purpose of eliminating maximum and tight swaging at locations on the hose section subjected to maximum bending or flexing.

A further object is to provide a swaged and soldered connection for flexible metal hose of a design and construction which lends itself to ease of production and which will be relatively inexpensive to manufacture while having maximum life with a minimum of connection failures under operating conditions.

With the foregoing and various other objects, features and results in view which will be readily apparent and recognized from the following detailed description and explanation, my invention consists in certain novel features in design and construction and in combinations of parts and elements and the functioning thereof, all as will be more fully and particularly referred to and specified hereinafter.

Referring to the accompanying drawings in which similar reference characters refer to corresponding parts throughout the several figures thereof:

FIG. 1 is a view in side elevation of a length or section of metallic braid sheathed and covered, corrugated metal hose having swaged and soldered connections of the invention on opposite ends thereof.

FIG. 2 is a longitudinal section through one of the swaged and soldered connections shown in FIG. 1.

FIG. 3 is a view in longitudinal section through a fitting and ring member of a connection of the invention and through the end of a corrugated hose on which the fitting and ring member are to be assembled, with the fitting, ring member and hose section end separated but in their relative positions of assembly.

FIG. 4 is a transverse section through the connection of FIG. 2, taken as on the line 4—4 of FIG. 2.

A form of connection embodying my invention has been selected and is illustrated in the accompanying drawings as an example for the purpose of describing and explaining the invention and the several features thereof. The example form of connection is shown as attached to one end of a length or section of corrugated, flexible metal hose H of the type encased or sheathed with a woven metallic braid B which covers and extends therearound over the exterior thereof throughout the length of the hose section. This section or length of metal hose H may be considered to be of any of the well-known standard or commercial forms generally used for conducting fluids under pressure and at high temperatures. Essentially this type of flexible, corrugated metal hose is formed from a relatively thin metallic tube which is suitably corrugated to form and provide the corrugations therearound extending from end to end thereof comprised of the radially outwardly extending corrugations C′ providing the maximum external diameter of the tube and the radially inwardly extending corrugation C″ providing the minimum internal diameter of and through the tube. The woven metallic braid B is tightly secured around the exterior and along the length of the corrugated hose section H in engagement with the outer edges of the outwardly extending corrugation C; and thus forms a metallic sheathing for the hose section. This metallic braid B is suitably woven in a manner familiar in the art from the usual metallic strands or wires, as will be generally clear by reference to FIG. 1 of the drawings. Due to the manner of weaving such a metallic braid B, it is found that at one end of a length or section of corrugated metal hose sheathed with such braid, such as the sheathed section H of the instant example, the braid B will snugly fit, contract onto and tightly cling to the exterior of the hose section, while at the opposite end the braid B will expand and flare radially outwardly from the hose and the strands or wires at such end will tend to unravel. Such condition of the braid at the end of a hose section makes the assembly of a connection fitting on the hose at that end extremely difficult, as well as interfering with the swaging and soldering of the connection fitting and the braid sheathed metal hose together into the final, rigidly joined connection.

It is found necessary in the use of lengths or sections of such metallic braid sheathed flexible corrugated metal hose to attach or connect an end thereof, or both ends, to another component or components, such as another section or length of hose or a component to which fluid is to be supplied by the hose section or which is to supply fluid to the hose section. In accordance with my invention I provide such a connection for coupling the end or ends of a metal hose section or length with another component or components, which essentially includes a connection fitting generally identified by the reference character 10 and including in the form of a tubular casing, the sleeve or body 11 and the threaded nipple 12. The tubular body 11 is formed at one end thereof to fit over and receive the metallic braid sheathed end of a hose section H and at the opposite end is provided with a threaded length or nipple portion 12 in axial continuation of the tubular body 11 but of reduced external diameter relative thereto for threading into connection in a component to which such end of the hose section H is to be connected and coupled. At a location intermediate the length thereof, the fitting 10 is provided with an enlarged diameter portion therearound formed with the flats 10a for engagement by a tool for turning the fitting and a hose section on which mounted. The tubular body 11 of the fitting 10 has an internal diameter greater than the external diameter of the metallic braid sheathed hose section H to be received therein.

In this example the fitting 10 has a substantially constant internal diameter flow passage 14 extending axially therethrough opening through the outer end of the nipple portion 12 and at the opposite end opening through the end of the tubular body 11. The fitting 10 provides a thin wall tubular extension 15 of the nipple portion 12 extending axially through the tubular body 11 and having an internal diameter carrying out and forming the constant diameter flow passage 14 through the fitting. The wall of this tubular extension thus extends through the tubular body 11 spaced from and generally concentric with the wall 16 of body 11 so that a relatively long or deep annular groove or recess 17 is formed within the tubular body 11 between the spaced walls 15 and 16 with this annular groove or recess closed at its inner end by the wall 18 and opening at its outer end through the end of the body 11 opposite the nipple portion 12 for receiving therein the end of a hose section H onto which the fitting 10 is to be attached and secured.

In assembling a connection of my invention and securing and attaching it in permanent rigid position on and to a length or section of corrugated metal hose H sheathed by the woven metallic braid 13, the end length of the hose with the braid sheathing thereon is to be inserted into the deep groove or annular recess 17 formed in and around the body 11 of the fitting 10 with the end edge of the hose located at the end wall 18 formed at the inner end of the annular recess between the inner wall 15 and the outer wall 16 of the body 11. However, following the teaching of my invention, before a sheathed hose end is inserted into position in the deep groove or annular recess 17 of the body 11 of the connection fitting 10, a ring member 20 is fitted over and around the exterior of the end of the metallic braid sheathed hose into a position with the end edge thereof adjacent the end edge of the hose section at the inner end of the recess 17, that is to say, located in a plane at or spaced but a slight distance inwardly from the plane of said end edge of the hose section and the braided sheathing thereon. The ring member 20 is then swaged tightly onto the hose section and the exterior sheating thereon into rigid and fixed position. In the present example this ring member 20 is preferably formed of copper and has a thickness to substantially occupy the annular space between the maximum exterior diameter of the braid sheathed hose and the inner side of the side wall 16 of the fitting body 11. The ring member 20 has an internal diameter to form a sliding fit over the exterior of the braid sheathing covered end of the hose section H so that it may readily be slipped ino position thereon and thereover.

If, as usual, the hose section H is to have a connection fitting of the invention mounted and attached on each of the opposite ends of the section, the ring member 20 for that section end where the metallic braid sheathing has the tendency to flare out and unravel is slipped onto the braid sheathing covered hose section from the opposite end and slid along the length of the hose section to and over the flared out braid sheathing ends to thus bring such ends back into normal position held tightly on and around the hose end. In this manner the difficulties of forcing a fitting onto the end of a hose section where the metallic braid sheathing has flared outwardly are overcome and the sheathing at such end of the hose section is brought into condition to be readily inserted and received in the deep annular recess 17 of the fitting body 11. The ring member 20 for the opposite end of the sheathed hose section H where the metallic braid sheathing contracts and snugly and tightly fits the exterior of the hose section, presents, of course, no problem of mounting either a ring member 20 or the fitting 10, the ring member being merely readily slipped on and over this braided sheathing end into the position relative to the end edge thereof as hereinabove described.

A ring member 20 of the invention has an internal diameter to form a sliding fit over the exterior of a braid sheathed and covered hose section, while the width of a ring member, that is the dimension axially thereof, may be taken to be in the present example as not to exceed approximately one-half of the depth, that is the dimension axially, of the deep annular groove or recess 17 formed in the body 11 of the fitting 10. Thus it will be noted that in mounted position on the end of a hose section H a ring member 20 is located at the outer end length of the end portion of the hose section which is received in the body recess 17 and is thus clear of the inner end length of the hose section end along the annular wall 16 of the body 11 of fitting 10. So positioned, the ring member 20 is clear of the main point of flexing or bending of the end length of a hose section onto which the connection fitting is mounted and attached in permanent rigid connection with the hose section end. Hence, the corrugations C' and C" along that portion of the hose section which are subjected to flexing or bending in the handling and operation of the hose section, are preserved against distortion, damage or destruction with the resulting weakening of the hose section and possible corrugation and hose failure at such location.

After a ring member 20 of a connection of the present invention is mounted on a hose section in position at and adjacent an outer end of the hose section, the ring member is then swaged tightly onto the corrugated hose section over the metallic braid sheathing B thereof, as will be clear by reference to FIG. 2. As the ring member 20 is applied and swaged into mechanical interlocking engagement on the hose section at the end of the length thereof that will be received in the annular recess 17 of the body 11 of the fitting 10, it follows that, the corrugations C' and C" at the location of or within the ring member are radially inwardly compressed and deformed from their normal shape and dimensions, as shown in FIG. 2. If, by chance, these corrugations should be broken or otherwise damaged, such result will have no serious consequence because such corrugations are at a location on the hose section end received in the body 11 where no flexing or bending of the hose section takes place to any appreciable degree and the damaged corrugations will thus not be placed under load by bending or flexing of the hose section. Further, as will be hereinafter pointed out, any distorted or damaged corrugations at the location of a ring member will be covered or embedded in solder in the final and completed connection of the invention.

After the ring member 20 is swaged into tight engagement on and around the end of the corrugated hose section, such end with the ring member 20 is then inserted into the deep annular groove or recess 17 of the body 11 of the fitting 10 with the swaged ring member thus located in position at the inner end portion of the groove or recess 17. With the hose section end and its swaged ring member 20 thereon received in the groove or recess 17 of the body 11, the inner end portion 21 of the wall 16 of the body 11 that extends from the inner edge of the ring member 20 to adjacent the end of the recess which receives the hose section end, is then swaged radially inwardly into engagement with the adjacent braid covered corrugations of the hose section. Such swaging is carried out to a degree not to grip the braided sheathing B and distort the corrugations C' and C" surrounded by such portion of wall 16, but only sufficiently to engage the ring member 20 or at least to reduce the inside diameter of the wall 16 at the swaged portion 21 thereof to a diameter less than the outside diameter of the ring member 20 so that the fitting 10 cannot be pulled off or displaced from the hose section end over and across the ring member. In this manner the connection fitting 10 is, in effect, locked onto the end of the hose section H and the ring member 20 swaged thereon to prevent axial displacement of the fitting 10 from its mounted position on the hose section. Thus a mechanical joint or connection is made between the end of the hose section H and the connection fitting 10 attached and assembled thereon without thereby distorting or damaging corrugations of the hose section at a location of primary bending or flexing.

It will be noted that in such attached and assembled position of the connection fitting 10, the end length of the corrugated hose section H is received and contained in the deep annular groove or recess 17 in the tubular body 11 with the inner wall 15 of this groove or recess completely guarding and sealing the flow passage 14 from communication with the groove or recess throughout the depth of the latter. The tubular wall extension 15 thus, in effect, forms a protective dam between and against leakage or flow from the groove or recess 17 into the flow passage 14 for a purpose to be hereinafter described.

After the assembly of the connection fitting 10 and the ring member 20 into their swaged and interlocked positions on and mechanically connected to the hose section H, the connection is completed by dipping or immersing the assembly at the end of the hose section into molten solder so that the solder fills the deep annular groove or recess 17 and the voids or spaces therein between the walls 15 and 16 and the metallic braid sheathed and covered end of the corrugated hose section with the ring member 20 therearound. Similarly, the molten solder in the groove or recess 17 fills the voids or spaces in and between the corrugations C' and C" so that a solid mass of solder S forms a solid soldered joint or connection in the recess 17 between the walls 15 and 16 and ring member 20 and the metallic braid sheathed and covered corrugated end of the hose section in such recess. In addition to forming and completing the solder joint or bond between the fitting body 11 and the end of the hose section and the ring member 20 swaged thereon, the body of solder S forms a seal which seals the main flow passage 14 against leakage therefrom through the completed connection. The completed swaged and soldered connection on a hose section showing the mass of solder S in the recess or groove 17 with the hose section end embedded therein and bonded thereto is clearly illustrated in the sectional view of FIG. 2 of the drawings hereof.

With a swaged and soldered connection of the invention, as hereinabove described, if through various conditions the solder S should disintegrate or weaken to the extent that the bond or soldered joint formed thereby with the hose section end and the fitting body 11, is broken, the hose section end cannot be disconnected and displaced from the fitting 10 by pressures in the latter due to the mechanical interlock formed between the hose section end and its ring member 20 and the swaged wall 16 of the fitting body 11. In the event of disintegration or breakdown of the solder joint, the connection will, of course, leak, but the fitting 10 being locked on the hose section end will not permit the latter to be disconnected and displaced by pressures in the hose section. In the use of these corrugated metal hose sections with pressure fluids, such as steam under pressures of 90 to 100 pounds to the square inch and temperatures ranging from 320° F. to 327° F., it is essential to prevent disconnection and displacement by the steam pressures of the hose end from the fitting 10 in the event of breakdown of the solder joint, because of the danger of injury from whipping or lashing of the freed hose end and of burning by the steam under pressure suddenly discharging from the end of the hose section opened by the disconnection therefrom of the fitting.

In addition to the above advantage of the mechanical interlocking of the fitting on the hose section end, there is the further advantage in the handling and manipulation of the hose section with the fitting assembled and interlocked thereon in applying and forming the solder joint, in that, there is no danger of the fitting slipping from assembled position on the hose section during operations of applying the solder and forming the solder joint. The solder S of the example connection of the invention herein disclosed may be taken to be preferably of a character to become plastic at around 435° F. and to become liquid or molten at approximately 576° F. Obviously the invention is not limited in all respects to solders having such softening point and melting point ranges, but a solder is preferably selected and used of high enough softening point to avoid softening at the temperatures to which the connection is subjected in the operation thereof as a connection on a hose section so that the solder joint of the connection will be maintained with the solder seal preserved.

It will also be evident that various changes, modifications, eliminations, substitutions and additions may be resorted to without departing from the broad spirit and scope of my invention, and hence I do not desire to limit my invention in all respects to the exact and specific construction of the example hereof, except as may be required by specific intended limitations thereto appearing in any of the claims hereto appended.

What I claim is:

1. In combination, a section of flexible corrugated metal hose having a flexible metallic sheathing thereover; a ring member contracted radially inwardly onto said hose section over said sheathing at one end thereof with said sheathing and the corrugations of said hose section being compressed radially inwardly and deformed by said ring member with the latter mechanically locked in fixed rigid position on said hose section and sheathing; the outside diameter of said ring member when in its compressed state being somewhat greater than the original outside diameter of said flexible metallic sheathing; a connection fitting having an axial bore therethrough and an annular recess around said bore coaxial therewith; said annular recess opening through an end of said fitting around said bore and having a depth axially greater than the length axially of said ring member; said end of said hose section with said ring member thereon being positioned in said annular recess around said bore with said ring member located in said recess spaced inwardly from the outer end thereof; the portion of said connection fitting around said recess that extends outwardly along said hose section beyond said ring member being compressed radially inwardly to a contracted position having an inner diameter less than that of said ring member but not exceeding the original outside diameter of said flexible metallic sheathing, thereby locking said hose section, sheathing, and ring member in said annular recess against axial displacement outwardly therein; and solder in the voids of said recess around said hose section, sheathing and ring member forming a soldered joint and connection between and positively bonding said hose section, sheathing and ring member to said connection fitting.

2. In combination, a section of flexible corrugated metal hose; a ring member contracted radially inwardly onto said hose section at one end thereof with said corrugations of said hose section being compressed radially inwardly and deformed by said ring member with the latter mechanically locked in fixed rigid position on said hose section; the outside diameter of said ring member when in its compressed state being somewhat greater than the original outside diameter of said hose section; a connection fitting having an axial bore therethrough and an annular recess around said bore coaxial therewith; said annular recess opening through an end of said fitting around said bore and having a depth axially greater than the length axially of said ring member, said end of said hose section with said ring member thereon being positioned in said annular recess around said bore with said ring member located in said recess spaced inwardly from the outer end thereof; the portion of said connection fitting around said recess that extends outwardly along said hose section beyond said ring member being compressed radially inwardly to a contracted position having an inner diameter less than that of said ring member but not exceeding the original outside diameter of said hose section, thereby locking said hose section and ring member in said annular recess against axial displacement outwardly therein; and solder in the voids of said recess around said hose section and ring member forming a soldered joint and connection between and positively bonding said hose section and ring member to said connection fitting.

References Cited in the file of this patent

UNITED STATES PATENTS

| | | |
|---|---|---|
| 347,947 | Miles | Aug. 24, 1886 |
| 2,132,326 | Stone | Oct. 4, 1938 |
| 2,142,357 | Jacobson | Jan. 3, 1939 |
| 2,250,286 | White | July 22, 1941 |
| 2,437,879 | Guarnaschelli | June 21, 1949 |
| 2,678,836 | Courtot | May 18, 1954 |